US 9,557,166 B2

United States Patent
Thuries et al.

(10) Patent No.: US 9,557,166 B2
(45) Date of Patent: Jan. 31, 2017

(54) DIMENSIONING SYSTEM WITH MULTIPATH INTERFERENCE MITIGATION

(71) Applicant: Hand Held Products, Inc., Fort Mill, SC (US)

(72) Inventors: Serge Thuries, Saint Jean (FR); Alain Gillet, Toulouse (FR); Franck Laffargue, Toulouse (FR)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/519,179

(22) Filed: Oct. 21, 2014

(65) Prior Publication Data

US 2016/0109224 A1    Apr. 21, 2016

(51) Int. Cl.
G01B 11/24 (2006.01)
G01B 11/00 (2006.01)
G01B 11/25 (2006.01)
G01B 11/255 (2006.01)

(52) U.S. Cl.
CPC ............... G01B 11/24 (2013.01); G01B 11/00 (2013.01); G01B 11/2408 (2013.01); G01B 11/2513 (2013.01); G01B 11/2518 (2013.01); G01B 11/25 (2013.01); G01B 11/255 (2013.01)

(58) Field of Classification Search
CPC . G01B 11/24; G01B 11/2408; G01B 11/2441; G01B 11/25; G01B 11/2513; G01B 11/2518; G01B 11/2522; G01B 11/2527; G01B 11/255
USPC ................................. 356/601, 612
See application file for complete search history.

(56) References Cited

U.S. PATENT DOCUMENTS 3,971,065 A   7/1976   Bayer
4,398,811 A   8/1983   Nishioka et al.
4,495,559 A   1/1985   Gelatt, Jr.
4,730,190 A   3/1988   Win et al.
(Continued)

FOREIGN PATENT DOCUMENTS

AU   2004212587 A1   4/2005
DE      3335760 A1   4/1985
(Continued)

OTHER PUBLICATIONS

U.S. Appl. No. 13/367,978, filed Feb. 7, 2012, (Feng et al.); now abandoned.
(Continued)

Primary Examiner — Kara E Geisel
Assistant Examiner — Hina F Ayub
(74) Attorney, Agent, or Firm — Additon, Higgins & Pendleton, P.A.

(57) ABSTRACT

A system and method for measuring an item's dimensions using a time-of-flight dimensioning system is disclosed. The system and method mitigate multipath distortion and improve the accuracy of the measurements, especially in a mobile environment. To mitigate the multipath distortion, an imager captures an image of an item of interest. This image is processed to determine an illumination region corresponding item-of-interest's size, shape, and position. Using this information, an adjustable aperture's size, shape, and position are controlled so the light beam used in the time-of-flight analysis substantially illuminates the illumination region without first being reflected.

20 Claims, 5 Drawing Sheets

(56) References Cited

U.S. PATENT DOCUMENTS

| | | | |
|---|---|---|---|
| 4,803,639 A | 2/1989 | Steele et al. | |
| 5,220,536 A | 6/1993 | Stringer et al. | |
| 5,331,118 A | 7/1994 | Jensen | |
| 5,359,185 A | 10/1994 | Hanson | |
| 5,384,901 A | 1/1995 | Glassner et al. | |
| 5,548,707 A | 8/1996 | LoNegro | |
| 5,555,090 A | 9/1996 | Schmutz | |
| 5,590,060 A | 12/1996 | Granville et al. | |
| 5,606,534 A | 2/1997 | Stringer et al. | |
| 5,619,245 A | 4/1997 | Kessler et al. | |
| 5,655,095 A | 8/1997 | LoNegro et al. | |
| 5,661,561 A | 8/1997 | Wurz et al. | |
| 5,699,161 A | 12/1997 | Woodworth | |
| 5,729,750 A | 3/1998 | Ishida | |
| 5,730,252 A | 3/1998 | Herbinet | |
| 5,734,476 A | 3/1998 | Dlugos | |
| 5,737,074 A * | 4/1998 | Haga | G01N 21/8806 356/237.2 |
| 5,831,737 A | 11/1998 | Stringer et al. | |
| 5,850,370 A | 12/1998 | Stringer et al. | |
| 5,850,490 A | 12/1998 | Johnson | |
| 5,869,827 A | 2/1999 | Rando | |
| 5,870,220 A | 2/1999 | Migdal et al. | |
| 5,900,611 A | 5/1999 | Hecht | |
| 5,923,428 A | 7/1999 | Woodworth | |
| 5,929,856 A | 7/1999 | LoNegro et al. | |
| 5,969,823 A | 10/1999 | Wurz et al. | |
| 5,978,512 A | 11/1999 | Kim | |
| 5,979,760 A | 11/1999 | Freyman et al. | |
| 5,988,862 A | 11/1999 | Kacyra et al. | |
| 5,991,041 A | 11/1999 | Woodworth | |
| 6,025,847 A | 2/2000 | Marks | |
| 6,049,386 A | 4/2000 | Stringer et al. | |
| 6,053,409 A | 4/2000 | Brobst et al. | |
| 6,064,759 A | 5/2000 | Buckley et al. | |
| 6,067,110 A | 5/2000 | Nonaka et al. | |
| 6,069,696 A | 5/2000 | McQueen et al. | |
| 6,137,577 A | 10/2000 | Woodworth | |
| 6,177,999 B1 | 1/2001 | Wurz et al. | |
| 6,236,403 B1 | 5/2001 | Chaki | |
| 6,246,468 B1 | 6/2001 | Dimsdale | |
| 6,333,749 B1 | 12/2001 | Reinhardt et al. | |
| 6,336,587 B1 | 1/2002 | He et al. | |
| 6,369,401 B1 | 4/2002 | Lee | |
| 6,373,579 B1 | 4/2002 | Ober et al. | |
| 6,429,803 B1 * | 8/2002 | Kumar | H01Q 3/44 342/368 |
| 6,457,642 B1 | 10/2002 | Good et al. | |
| 6,507,406 B1 | 1/2003 | Yagi et al. | |
| 6,517,004 B2 | 2/2003 | Good et al. | |
| 6,674,904 B1 | 1/2004 | McQueen | |
| 6,705,526 B1 | 3/2004 | Zhu et al. | |
| 6,781,621 B1 | 8/2004 | Gobush et al. | |
| 6,824,058 B2 | 11/2004 | Patel et al. | |
| 6,832,725 B2 | 12/2004 | Gardiner et al. | |
| 6,858,857 B2 | 2/2005 | Pease et al. | |
| 6,971,580 B2 | 12/2005 | Zhu et al. | |
| 6,995,762 B1 | 2/2006 | Pavlidis et al. | |
| 7,085,409 B2 | 8/2006 | Sawhney et al. | |
| 7,086,162 B2 | 8/2006 | Tyroler | |
| 7,104,453 B1 | 9/2006 | Zhu et al. | |
| 7,128,266 B2 | 10/2006 | Zhu et al. | |
| 7,137,556 B1 | 11/2006 | Bonner et al. | |
| 7,159,783 B2 | 1/2007 | Walczyk et al. | |
| 7,161,688 B1 | 1/2007 | Bonner et al. | |
| 7,214,954 B2 | 5/2007 | Schopp | |
| 7,277,187 B2 | 10/2007 | Smith et al. | |
| 7,307,653 B2 | 12/2007 | Dutta | |
| 7,310,431 B2 | 12/2007 | Gokturk et al. | |
| 7,413,127 B2 | 8/2008 | Ehrhart et al. | |
| 7,527,205 B2 | 5/2009 | Zhu et al. | |
| 7,586,049 B2 | 9/2009 | Wurz | |
| 7,602,404 B1 | 10/2009 | Reinhardt et al. | |
| 7,639,722 B1 | 12/2009 | Paxton et al. | |
| 7,726,575 B2 | 6/2010 | Wang et al. | |
| 7,780,084 B2 | 8/2010 | Zhang et al. | |
| 7,788,883 B2 | 9/2010 | Buckley et al. | |
| 7,974,025 B2 | 7/2011 | Topliss | |
| 8,027,096 B2 | 9/2011 | Feng et al. | |
| 8,028,501 B2 | 10/2011 | Buckley et al. | |
| 8,050,461 B2 | 11/2011 | Shpunt et al. | |
| 8,055,061 B2 | 11/2011 | Katano | |
| 8,102,395 B2 | 1/2012 | Kondo et al. | |
| 8,132,728 B2 | 3/2012 | Dwinell et al. | |
| 8,134,717 B2 | 3/2012 | Pangrazio et al. | |
| 8,149,224 B1 | 4/2012 | Kuo et al. | |
| 8,194,097 B2 | 6/2012 | Xiao et al. | |
| 8,212,889 B2 | 7/2012 | Chanas et al. | |
| 8,228,510 B2 | 7/2012 | Pangrazio et al. | |
| 8,294,969 B2 | 10/2012 | Plesko | |
| 8,305,458 B2 | 11/2012 | Hara | |
| 8,310,656 B2 | 11/2012 | Zalewski | |
| 8,313,380 B2 | 11/2012 | Zalewski et al. | |
| 8,317,105 B2 | 11/2012 | Kotlarsky et al. | |
| 8,322,622 B2 | 12/2012 | Liu | |
| 8,339,462 B2 | 12/2012 | Stec et al. | |
| 8,350,959 B2 | 1/2013 | Topliss et al. | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,976 B2 | 2/2013 | Mohideen et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,437,539 B2 | 5/2013 | Komatsu et al. | |
| 8,441,749 B2 | 5/2013 | Brown et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,463,079 B2 | 6/2013 | Ackley et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,570,343 B2 | 10/2013 | Halstead | |
| 8,571,307 B2 | 10/2013 | Li et al. | |
| 8,576,390 B1 | 11/2013 | Nunnink | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |

(56) References Cited

U.S. PATENT DOCUMENTS

| | | |
|---|---|---|
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,792,688 B2 | 7/2014 | Unsworth |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,810,779 B1 | 8/2014 | Hilde |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,897,596 B1 | 11/2014 | Passmore et al. |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |

(56) References Cited

U.S. PATENT DOCUMENTS

| | | | |
|---|---|---|---|
| D734,339 S | 7/2015 | Zhou et al. | |
| D734,751 S | 7/2015 | Oberpriller et al. | |
| 9,082,023 B2 | 7/2015 | Feng et al. | |
| 9,233,470 B1 | 1/2016 | Bradski et al. | |
| 9,299,013 B1 | 3/2016 | Curlander et al. | |
| 2001/0027995 A1 | 10/2001 | Patel et al. | |
| 2001/0032879 A1 | 10/2001 | He et al. | |
| 2002/0054289 A1 | 5/2002 | Thibault et al. | |
| 2002/0118874 A1 | 8/2002 | Chung et al. | |
| 2002/0158873 A1 | 10/2002 | Williamson | |
| 2002/0167677 A1 | 11/2002 | Okada et al. | |
| 2002/0179708 A1 | 12/2002 | Zhu et al. | |
| 2003/0038179 A1 | 2/2003 | Tsikos et al. | |
| 2003/0053513 A1 | 3/2003 | Vatan et al. | |
| 2003/0063086 A1 | 4/2003 | Baumberg | |
| 2003/0091227 A1 | 5/2003 | Chang et al. | |
| 2003/0156756 A1 | 8/2003 | Gokturk et al. | |
| 2003/0197138 A1 | 10/2003 | Pease et al. | |
| 2003/0235331 A1* | 12/2003 | Kawaike | F16P 3/14 382/154 |
| 2004/0008259 A1 | 1/2004 | Gokturk et al. | |
| 2004/0024754 A1 | 2/2004 | Mane et al. | |
| 2004/0066329 A1 | 4/2004 | Zeitfuss et al. | |
| 2004/0118928 A1 | 6/2004 | Patel et al. | |
| 2004/0122779 A1 | 6/2004 | Stickler et al. | |
| 2004/0155975 A1 | 8/2004 | Hart et al. | |
| 2004/0165090 A1 | 8/2004 | Ning | |
| 2004/0184041 A1 | 9/2004 | Schopp | |
| 2004/0211836 A1 | 10/2004 | Patel et al. | |
| 2004/0233461 A1 | 11/2004 | Armstrong et al. | |
| 2004/0258353 A1 | 12/2004 | Gluckstad et al. | |
| 2005/0006477 A1 | 1/2005 | Patel | |
| 2005/0117215 A1 | 6/2005 | Lange | |
| 2005/0128193 A1 | 6/2005 | Lueder | |
| 2005/0128196 A1 | 6/2005 | Popescu et al. | |
| 2005/0211782 A1 | 9/2005 | Martin | |
| 2005/0264867 A1 | 12/2005 | Cho et al. | |
| 2006/0112023 A1 | 5/2006 | Horhann | |
| 2006/0151604 A1 | 7/2006 | Zhu et al. | |
| 2006/0159307 A1 | 7/2006 | Anderson et al. | |
| 2006/0159344 A1 | 7/2006 | Shao et al. | |
| 2006/0232681 A1 | 10/2006 | Okada | |
| 2006/0255150 A1 | 11/2006 | Longacre | |
| 2006/0269165 A1 | 11/2006 | Viswanathan | |
| 2007/0025612 A1 | 2/2007 | Iwasaki et al. | |
| 2007/0031064 A1 | 2/2007 | Zhao et al. | |
| 2007/0063048 A1 | 3/2007 | Havens et al. | |
| 2007/0127022 A1* | 6/2007 | Cohen | G01J 3/02 356/326 |
| 2007/0153293 A1 | 7/2007 | Gruhlke et al. | |
| 2007/0171220 A1 | 7/2007 | Kriveshko | |
| 2007/0181685 A1 | 8/2007 | Zhu et al. | |
| 2007/0237356 A1 | 10/2007 | Dwinell et al. | |
| 2007/0299338 A1 | 12/2007 | Stevick et al. | |
| 2008/0013793 A1 | 1/2008 | Hillis et al. | |
| 2008/0035390 A1* | 2/2008 | Wurz | G01B 11/04 177/25.15 |
| 2008/0056536 A1 | 3/2008 | Hildreth et al. | |
| 2008/0077265 A1 | 3/2008 | Boyden | |
| 2008/0164074 A1 | 7/2008 | Wurz | |
| 2008/0212168 A1 | 9/2008 | Olmstead et al. | |
| 2008/0247635 A1 | 10/2008 | Davis et al. | |
| 2008/0273191 A1* | 11/2008 | Kim | G01C 3/08 356/4.01 |
| 2008/0278790 A1* | 11/2008 | Boesser | G01B 11/24 359/227 |
| 2009/0059004 A1 | 3/2009 | Bochicchio | |
| 2009/0134221 A1 | 5/2009 | Zhu et al. | |
| 2009/0195790 A1 | 8/2009 | Zhu et al. | |
| 2009/0225333 A1 | 9/2009 | Bendall et al. | |
| 2009/0237411 A1 | 9/2009 | Gossweiler et al. | |
| 2009/0268023 A1 | 10/2009 | Hsieh | |
| 2009/0272724 A1* | 11/2009 | Gubler | B23K 26/0656 219/121.64 |
| 2009/0273770 A1 | 11/2009 | Bauhahn et al. | |
| 2009/0313948 A1 | 12/2009 | Buckley et al. | |
| 2009/0323084 A1 | 12/2009 | Dunn et al. | |
| 2010/0035637 A1 | 2/2010 | Varanasi et al. | |
| 2010/0128109 A1 | 5/2010 | Banks | |
| 2010/0161170 A1 | 6/2010 | Siris | |
| 2010/0172567 A1 | 7/2010 | Prokoski | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2010/0202702 A1 | 8/2010 | Benos et al. | |
| 2010/0208039 A1 | 8/2010 | Stettner | |
| 2010/0211355 A1 | 8/2010 | Horst et al. | |
| 2010/0217678 A1 | 8/2010 | Goncalves | |
| 2010/0220849 A1 | 9/2010 | Colbert et al. | |
| 2010/0220894 A1 | 9/2010 | Ackley et al. | |
| 2010/0245850 A1 | 9/2010 | Lee et al. | |
| 2010/0254611 A1* | 10/2010 | Arnz | G03F 9/7092 382/199 |
| 2010/0303336 A1 | 12/2010 | Abraham | |
| 2011/0019155 A1 | 1/2011 | Daniel et al. | |
| 2011/0040192 A1* | 2/2011 | Brenner | A61B 5/0059 600/476 |
| 2011/0043609 A1 | 2/2011 | Choi et al. | |
| 2011/0099474 A1 | 4/2011 | Grossman et al. | |
| 2011/0169999 A1 | 7/2011 | Grunow et al. | |
| 2011/0188054 A1 | 8/2011 | Petronius et al. | |
| 2011/0188741 A1 | 8/2011 | Sones et al. | |
| 2011/0202554 A1 | 8/2011 | Powilleit et al. | |
| 2011/0249864 A1 | 10/2011 | Venkatesan et al. | |
| 2011/0254840 A1 | 10/2011 | Halstead | |
| 2011/0279916 A1 | 11/2011 | Brown et al. | |
| 2011/0286007 A1 | 11/2011 | Pangrazio et al. | |
| 2011/0286628 A1 | 11/2011 | Goncalves et al. | |
| 2011/0288818 A1 | 11/2011 | Thierman | |
| 2011/0301994 A1 | 12/2011 | Tieman | |
| 2012/0024952 A1 | 2/2012 | Chen | |
| 2012/0056982 A1 | 3/2012 | Katz et al. | |
| 2012/0057345 A1 | 3/2012 | Kuchibhotla | |
| 2012/0074227 A1 | 3/2012 | Ferren et al. | |
| 2012/0081714 A1 | 4/2012 | Pangrazio et al. | |
| 2012/0111946 A1 | 5/2012 | Golant | |
| 2012/0113223 A1 | 5/2012 | Hilliges et al. | |
| 2012/0113250 A1 | 5/2012 | Farlotti et al. | |
| 2012/0140300 A1* | 6/2012 | Freeman | G02B 27/0103 359/9 |
| 2012/0168512 A1 | 7/2012 | Kotlarsky et al. | |
| 2012/0179665 A1* | 7/2012 | Baarman | G06F 19/3475 707/709 |
| 2012/0185094 A1 | 7/2012 | Rosenstein et al. | |
| 2012/0193423 A1 | 8/2012 | Samek | |
| 2012/0197464 A1 | 8/2012 | Wang et al. | |
| 2012/0203647 A1 | 8/2012 | Smith | |
| 2012/0218436 A1 | 8/2012 | Rodriguez et al. | |
| 2012/0223141 A1 | 9/2012 | Good et al. | |
| 2012/0224026 A1 | 9/2012 | Bayer et al. | |
| 2012/0236288 A1 | 9/2012 | Stanley | |
| 2012/0242852 A1 | 9/2012 | Hayward et al. | |
| 2012/0262558 A1 | 10/2012 | Boger et al. | |
| 2012/0280908 A1 | 11/2012 | Rhoads et al. | |
| 2012/0282905 A1 | 11/2012 | Owen | |
| 2012/0282911 A1 | 11/2012 | Davis et al. | |
| 2012/0284012 A1 | 11/2012 | Rodriguez et al. | |
| 2012/0284122 A1 | 11/2012 | Brandis | |
| 2012/0284339 A1 | 11/2012 | Rodriguez | |
| 2012/0284593 A1 | 11/2012 | Rodriguez | |
| 2012/0293610 A1 | 11/2012 | Doepke et al. | |
| 2012/0294549 A1 | 11/2012 | Doepke | |
| 2012/0299961 A1 | 11/2012 | Ramkumar et al. | |
| 2012/0300991 A1 | 11/2012 | Free | |
| 2012/0313848 A1 | 12/2012 | Galor et al. | |
| 2012/0314030 A1 | 12/2012 | Datta | |
| 2012/0314058 A1 | 12/2012 | Bendall et al. | |
| 2012/0316820 A1 | 12/2012 | Nakazato et al. | |
| 2013/0038881 A1 | 2/2013 | Pesach et al. | |
| 2013/0038941 A1 | 2/2013 | Pesach et al. | |
| 2013/0043312 A1 | 2/2013 | Van Horn | |
| 2013/0050426 A1 | 2/2013 | Sarmast et al. | |

(56) References Cited

U.S. PATENT DOCUMENTS

| | | |
|---|---|---|
| 2013/0075168 A1 | 3/2013 | Amundsen et al. |
| 2013/0094069 A1* | 4/2013 | Lee .......................... G03H 1/02 359/3 |
| 2013/0101158 A1 | 4/2013 | Lloyd et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbeck et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0329012 A1 | 12/2013 | Bartos |
| 2013/0329013 A1 | 12/2013 | Metois et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0021259 A1 | 1/2014 | Moed et al. |
| 2014/0025584 A1 | 1/2014 | Liu et al. |
| 2014/0034731 A1 | 2/2014 | Gao et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0091147 A1 | 4/2014 | Evans et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0104664 A1* | 4/2014 | Lee ...................... G03H 1/0808 359/9 |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre, Jr. et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0152975 A1* | 6/2014 | Ko .......................... G01S 17/89 356/5.01 |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0192187 A1 | 7/2014 | Atwell et al. |
| 2014/0192551 A1* | 7/2014 | Masaki ................ A61B 1/0661 362/574 |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0232930 A1 | 8/2014 | Anderson |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1* | 9/2014 | Tohme .................. G01S 17/003 356/3.08 |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0313527 A1 | 10/2014 | Askan |
| 2014/0319220 A1 | 10/2014 | Coyle |
| 2014/0319221 A1 | 10/2014 | Oberpriller et al. |
| 2014/0320408 A1 | 10/2014 | Zagorsek et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0347553 A1 | 11/2014 | Ovsiannikov et al. |
| 2014/0350710 A1 | 11/2014 | Gopalkrishnan et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |

(56) References Cited

U.S. PATENT DOCUMENTS

| | | |
|---|---|---|
| 2015/0003673 A1 | 1/2015 | Fletcher |
| 2015/0009301 A1* | 1/2015 | Ribnick ............... G01B 11/303 348/50 |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0163474 A1* | 6/2015 | You ........................ G01S 17/89 348/46 |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204662 A1 | 7/2015 | Kobayashi et al. |
| 2015/0204671 A1 | 7/2015 | Showering |
| 2015/0213647 A1 | 7/2015 | Laffargue et al. |
| 2015/0269403 A1 | 9/2015 | Lei et al. |
| 2015/0308816 A1 | 10/2015 | Laffargue et al. |
| 2015/0355470 A1 | 12/2015 | Herschbach |
| 2016/0063429 A1 | 3/2016 | Varley et al. |
| 2016/0169665 A1 | 6/2016 | Deschenes et al. |
| 2016/0202478 A1 | 7/2016 | Masson et al. |

FOREIGN PATENT DOCUMENTS

| | | | |
|---|---|---|---|
| DE | 10210813 | A1 | 10/2003 |
| DE | 102007037282 | A1 | 3/2008 |
| EP | 1111435 | A2 | 6/2001 |
| EP | 1443312 | A1 | 8/2004 |
| EP | 2381421 | A2 | 10/2011 |
| EP | 2533009 | A2 | 12/2012 |
| EP | 2722656 | A1 | 4/2014 |
| EP | 2779027 | A1 | 9/2014 |
| EP | 2843590 | A1 | 3/2015 |
| EP | 2845170 | A1 | 3/2015 |
| EP | 2966595 | A1 | 1/2016 |
| EP | 3006893 | A1 | 3/2016 |
| EP | 3012601 | A1 | 3/2016 |
| EP | 3007096 | A1 | 4/2016 |
| GB | 2503978 | A | 1/2014 |
| GB | 2531928 | A | 5/2016 |
| JP | H04129902 | A | 4/1992 |
| JP | 2008210276 | A | 9/2008 |
| JP | 2014210646 | A | 11/2014 |
| KR | 20110013200 | A | 2/2011 |
| KR | 20110117020 | A | 10/2011 |
| KR | 20120028109 | A | 3/2012 |
| WO | 0114836 | A1 | 3/2001 |
| WO | 2006095110 | A1 | 9/2006 |
| WO | 2007015059 | A1 | 2/2007 |
| WO | 2011017241 | A1 | 2/2011 |
| WO | 2012175731 | A1 | 12/2012 |
| WO | 2013021157 | A1 | 2/2013 |
| WO | 2013033442 | A1 | 3/2013 |
| WO | 2013163789 | A1 | 11/2013 |
| WO | 2013166368 | A1 | 11/2013 |
| WO | 2013173985 | A1 | 11/2013 |
| WO | 2014019130 | A1 | 2/2014 |
| WO | 2014102341 | A1 | 7/2014 |
| WO | 2014110495 | A1 | 7/2014 |
| WO | 2014149702 | A1 | 9/2014 |
| WO | 2014151746 | A2 | 9/2014 |
| WO | 2015006865 | A1 | 1/2015 |
| WO | 2016020038 | A1 | 2/2016 |
| WO | 2016061699 | A1 | 4/2016 |

OTHER PUBLICATIONS

U.S. Appl. No. 14/462,801 for Mobile Computing Device With Data Cognition Software, filed on Aug. 19, 2014 (Todeschini et al.); 38 pages.

U.S. Appl. No. 14/596,757 for System and Method for Detecting Barcode Printing Errors filed Jan. 14, 2015 (Ackley); 41 pages.

U.S. Appl. No. 14/277,337 for Multipurpose Optical Reader, filed May 14, 2014 (Jovanovski et al.); 59 pages.

U.S. Appl. No. 14/200,405 for Indicia Reader for Size-Limited Applications filed Mar. 7, 2014 (Feng et al.); 42 pages.

U.S. Appl. No. 14/662,922 for Multifunction Point of Sale System filed Mar. 19, 2015 (Van Horn et al.); 41 pages.

U.S. Appl. No. 14/446,391 for Multifunction Point of Sale Apparatus With Optical Signature Capture filed Jul. 30, 2014 (Good et al.); 37 pages.

U.S. Appl. No. 29/528,165 for In-Counter Barcode Scanner filed May 27, 2015 (Oberpriller et al.); 13 pages.

U.S. Appl. No. 29/528,890 for Mobile Computer Housing filed Jun. 2, 2015 (Fitch et al.); 61 pages.

U.S. Appl. No. 14/614,796 for Cargo Apportionment Techniques filed Feb. 5, 2015 (Morton et al.); 56 pages.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 14/578,627 for Safety System and Method filed Dec. 22, 2014 (Ackley et al.); 32 pages.

U.S. Appl. No. 14/573,022 for Dynamic Diagnostic Indicator Generation filed Dec. 17, 2014 (Goldsmith); 43 pages.

U.S. Appl. No. 14/529,857 for Barcode Reader With Security Features filed Oct. 31, 2014 (Todeschini et al.); 32 pages.

U.S. Appl. No. 14/519,195 for Handheld Dimensioning System With Feedback filed Oct. 21, 2014 (Laffargue et al.); 39 pages.

U.S. Appl. No. 14/519,211 for System and Method for Dimensioning filed Oct. 21, 2014 (Ackley et al.); 33 pages.

U.S. Appl. No. 14/519,233 for Handheld Dimensioner With Data-Quality Indication filed Oct. 21, 2014 (Laffargue et al.); 36 pages.

U.S. Appl. No. 14/533,319 for Barcode Scanning System Using Wearable Device With Embedded Camera filed Nov. 5, 2014 (Todeschini); 29 pages.

(56) References Cited

OTHER PUBLICATIONS

U.S. Appl. No. 14/748,446 for Cordless Indicia Reader With a Multifunction Coil for Wireless Charging and EAS Deactivation, filed Jun. 24, 2015 (Xie et al.); 34 pages.
U.S. Appl. No. 29/528,590 for Electronic Device filed May 29, 2015 (Fitch et al.); 9 pages.
U.S. Appl. No. 14/519,249 for Handheld Dimensioning System With Measurement-Conformance Feedback filed Oct. 21, 2014 (Ackley et al.); 36 pages.
U.S. Appl. No. 29/519,017 for Scanner filed Mar. 2, 2015 (Zhou et al.); 11 pages.
U.S. Appl. No. 14/398,542 for Portable Electronic Devices Having a Separate Location Trigger Unit for Use in Controlling an Application Unit filed Nov. 3, 2014 (Bian et al.); 22 pages.
U.S. Appl. No. 14/405,278 for Design Pattern for Secure Store filed Mar. 9, 2015 (Zhu et al.); 23 pages.
U.S. Appl. No. 14/590,024 for Shelving and Package Locating Systems for Delivery Vehicles filed Jan. 6, 2015 (Payne); 31 pages.
U.S. Appl. No. 14/568,305 for Auto-Contrast Viewfinder for an Indicia Reader filed Dec. 12, 2014 (Todeschini); 29 pages.
U.S. Appl. No. 29/526,918 for Charging Base filed May 14, 2015 (Fitch et al.); 10 pages.
U.S. Appl. No. 14/580,262 for Media Gate for Thermal Transfer Printers filed Dec. 23, 2014 (Bowles); 36 pages.
U.S. Appl. No. 14/519,179 for Dimensioning System With Multipath Interference Mitigation filed Oct. 21, 2014 (Thuries et al.); 30 pages.
U.S. Appl. No. 14/264,173 for Autofocus Lens System for Indicia Readers filed Apr. 29, 2014, (Ackley et al.); 39 pages.
U.S. Appl. No. 14/453,019 for Dimensioning System With Guided Alignment, filed Aug. 6, 2014 (Li et al.); 31 pages.
U.S. Appl. No. 14/452,697 for Interactive Indicia Reader , filed Aug. 6, 2014, (Todeschini); 32 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 14/715,916 for Evaluating Image Values filed May 19, 2015 (Ackley); 60 pages.
U.S. Appl. No. 14/513,808 for Identifying Inventory Items in a Storage Facility filed Oct. 14, 2014 (Singel et al.); 51 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 14/483,056 for Variable Depth of Field Barcode Scanner filed Sep. 10, 2014 (McCloskey et al.); 29 pages.
U.S. Appl. No. 14/531,154 for Directing an Inspector Through an Inspection filed Nov. 3, 2014 (Miller et al.); 53 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 14/340,627 for an Axially Reinforced Flexible Scan Element, filed Jul. 25, 2014 (Reublinger et al.); 41 pages.
U.S. Appl. No. 14/676,327 for Device Management Proxy for Secure Devices filed Apr. 1, 2015 (Yeakley et al.); 50 pages.
U.S. Appl. No. 14/257,364 for Docking System and Method Using Near Field Communication filed Apr. 21, 2014 (Showering); 31 pages.
U.S. Appl. No. 14/327,827 for a Mobile-Phone Adapter for Electronic Transactions, filed Jul. 10, 2014 (Hejl); 25 pages.
U.S. Appl. No. 14/334,934 for a System and Method for Indicia Verification, filed Jul. 18, 2014 (Heil); 38 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages.
U.S. Appl. No. 14/619,093 for Methods for Training a Speech Recognition System filed Feb. 11, 2015 (Pecorari); 35 pages.
U.S. Appl. No. 29/524,186 for Scanner filed Apr. 17, 2015 (Zhou et al.); 17 pages.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/614,706 for Device for Supporting an Electronic Tool on a User's Hand filed Feb. 5, 2015 (Oberpriller et al.); 33 pages.
U.S. Appl. No. 14/628,708 for Device, System, and Method for Determining the Status of Checkout Lanes filed Feb. 23, 2015 (Todeschini); 37 pages.
U.S. Appl. No. 14/704,050 for Intermediate Linear Positioning filed May 5, 2015 (Charpentier et al.); 60 pages.
U.S. Appl. No. 14/529,563 for Adaptable Interface for a Mobile Computing Device filed Oct. 31, 2014 (Schoon et al.); 36 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/695,364 for Medication Management System filed Apr. 24, 2015 (Sewell et al.); 44 pages.
U.S. Appl. No. 14/664,063 for Method and Application for Scanning a Barcode With a Smart Device While Continuously Running and Displaying an Application on the Smart Device Display filed Mar. 20, 2015 (Todeschini); 37 pages.
U.S. Appl. No. 14/735,717 for Indicia-Reading Systems Having an Interface With a User's Nervous System filed Jun. 10, 2015 (Todeschini); 39 pages.
U.S. Appl. No. 14/527,191 for Method and System for Recognizing Speech Using Wildcards in an Expected Response filed Oct. 29, 2014 (Braho et al.); 45 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/535,764 for Concatenated Expected Responses for Speech Recognition filed Nov. 7, 2014 (Braho et al.); 51 pages.
U.S. Appl. No. 14/687,289 for System for Communication Via a Peripheral Hub filed Apr. 15, 2015 (Kohtz et al.); 37 pages.
U.S. Appl. No. 14/747,197 for Optical Pattern Projector filed Jun. 23, 2015 (Thuries et al.); 33 pages.
U.S. Appl. No. 14/674,329 for Aimer for Barcode Scanning filed Mar. 31, 2015 (Bidwell); 36 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Barndringa); 38 pages.
U.S. Appl. No. 14/695,923 for Secure Unattended Network Authentication filed Apr. 24, 2015 (Kubler et al.); 52 pages.
U.S. Appl. No. 14/740,373 for Calibrating a Volume Dimensioner filed Jun. 16, 2015 (Ackley et al.); 63 pages.
U.S. Appl. No. 14/519,179, Serge Thuries et al., filed Oct. 21, 2014, not published yet. 40 pages.
U.S. Appl. No. 14/519,249, H. Sprague Ackley et al., filed Oct. 21, 2014, not published yet. 36 pages.
U.S. Appl. No. 14/519,233, Franck Laffargue et al., filed Oct. 21, 2014, not published yet. 34 pages.
U.S. Appl. No. 14/519,211, H. Sprague Ackley et al., filed Oct. 21, 2014, not published yet. 33 pages.
U.S. Appl. No. 14/519,195, Franck Laffargue et al., filed Oct. 21, 2014, not published yet. 35 pages.
Peter Clarke, Actuator Developer Claims Anti-Shake Breakthrough For Smartphone Cams, Electronic Engineering Times, p. 24, May 16, 2011.
U.S. Appl. No. 14/055,234, not yet published, Hand Held Products, Inc. Filed Oct. 16, 2013; 26 pages.

(56) References Cited

OTHER PUBLICATIONS

U.S. Appl. No. 13/912,262, not yet published, Filed Jun. 7, 2013, Hand Held Products Inc., Method of Error Correction for 3D Imaging Device: 33 pages.
European Search Report for application No. EP13186043 (now EP2722656 (Apr. 23, 2014)): Total pp. 7.
International Search Report for PCT/US2013/039438 (WO2013166368), Oct. 1, 2013, 7 pages.
U.S. Appl. No. 14/453,019, not yet published, Filed Aug. 6, 2014, Hand Held Products Inc., Dimensioning System With Guided Alignment: 31 pages.
European Office Action for application EP 13186043, dated Jun. 12, 2014(now EP2722656 (Apr. 23, 2014)), Total of 6 pages.
U.S. Appl. No. 14/461,524, not yet published, Filed Aug. 18, 2014, Hand Held Products Inc., System and Method for Package Dimensioning: 21 pages.
U.S. Appl. No. 14/490,989, not yet published, Filed Sep. 19, 2014, Intermec IP Corporation, Volume Dimensioning System Calibration Systems and Methods:.
Wikipedia, YUV description and definition, downloaded from http://www.wikipeida.org/wiki/YUV on Jun. 29, 2012, 10 pages.
YUV Pixel Format, downloaded from http://www.fource.org/yuv.php on Jun. 29, 2012; 13 pages.
YUV to RGB Conversion, downloaded from http://www.fource.org/fccyvrgb.php on Jun. 29, 2012; 5 pages.
Benos et al., "Semi-Automatic Dimensioning with Imager of a Portable Device," U.S. Provisional U.S. Appl. No. 61/149,912; Filed Feb. 4, 2009 (now expired), 56 pages.
Dimensional Weight- Wikipedia, the Free Encyclopedia, URL=http://en.wikipedia.org/wiki/Dimensional_weight, download date Aug. 1, 2008, 2 pages.
Dimensioning—Wikipedia, the Free Encyclopedia, URL=http://en.wikipedia.org/wiki/Dimensioning, download date Aug. 1, 2008, 1 page.
Extended European Search Report in counterpart European Application No. 15182675.7 dated Dec. 4, 2015, pp. 1-10 (References previously cited.).
Office Action in counterpart European Application No. 13186043.9 dated Sep. 30, 2015, pp. 1-7 [All references previously cited.].
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant.
Search Report and Opinion in related GB Application No. 1517112.7, Dated Feb. 19, 2016, 6 Pages.
European Search Report for Related EP Application No. 15189214.8, dated Mar. 3, 2016, 9 pages.
"A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages.
European Partial Search Report for related EP Application No. 15190306.9, dated May 6, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
European Search Report for related EP Application No. 16152477.2, dated May 24, 2016, 8 pages [New Reference cited herein; Reference DE102007037282 A1 and its US Counterparts have been previously cited.].
Second Chinese Office Action in related CN Application No. 201520810685.6, Dated Mar. 22, 2016, 5 pages, no references.
European Search Report in related EP Application No. 15190315.0, Dated Apr. 1, 2016, 7 pages [Commonly owned Reference 2014/0104416 has been previously cited].
Second Chinese Office Action in related CN Application No. 2015220810562.2, Dated Mar. 22, 2016, 5 pages. English Translation provided [No references].
European Search Report for related Application EP 15190249.1, Dated Mar. 22, 2016, 7 pages.
Second Chinese Office Action in related CN Application No. 201520810313.3, Dated Mar. 22, 2016, 5 pages. English Translation provided [No references].
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
U.S. Appl. No. 14/800,757, Eric Todeschini, filed Jul. 16, 2015, not published yet, Dimensioning and Imaging Items, 80 pages.
Proesmans, Marc et al. "Active Acquisition of 3D Shape for Moving Objects" 0-7803-3258-X/96 1996 IEEE; 4 pages.
U.S. Appl. No. 14/747,197, Serge Thuries et al., filed Jun. 23, 2015, not published yet, Optical Pattern Projector; 33 pages.
U.S. Appl. No. 14/747,490, Brian L. Jovanovski et al., filed Jun. 23, 2015, not published yet, Dual-Projector Three-Dimensional Scanner; 40 pages.
U.S. Appl. No. 14/715,916, H. Sprague Ackley, filed May 19, 2015, not published yet, Evaluating Image Values; 54 pages.
U.S. Appl. No. 14/793,149, H. Sprague Ackley, filed Jul. 7, 2015, not published yet, Mobile Dimensioner Apparatus for Use in Commerce; 57 pages.
U.S. Appl. No. 14/740,373, H. Sprague Ackley et al., filed Jun. 16, 2015, not published yet, Calibrating A Volume Dimensioner; 63 pages.
U.S. Appl. No. 14/801,023, Tyler Doomenbal et al., filed Jul. 16, 2015, not published yet, Adjusting Dimensioning Results Using Augmented Reality, 39 pages.
Leotta, Matthew, Generic, Deformable Models for 3-D Vehicle Surveillance, May 2010, Doctoral Dissertation, Brown University, Providence RI, 248 pages.
Ward, Benjamin, Interactive 3D Reconstruction from Video, Aug. 2012, Doctoral Thesis, Univesity of Adelaide, Adelaide, South Australia, 157 pages.
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages.
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages.
Reisner-Kollmann, Irene; Anton L. Fuhrmann, Werner Purgathofer, Interactive Reconstruction of Industrial Sites Using Parametirc Models, May 2010, Proceedings of the 26th Spring Conference of Computer Graphics SCCG "10, 8 pages.
Drummond, Tom; Roberto Cipolla, Real-Time Visual Tracking of Complex Structures, Jul. 2002, IEEE Transactions on Pattem Analysis and Machine Intelligence, vol. 24, No. 7; 15 pages.
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages.
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages.
Spiller, Jonathan; Object Localization Using Deformable Templates, Master's Dissertation, University of the Witwatersrand, Johannesburg, South Africa, 2007; 74 pages.
EP Search and Written Opinion Report in related matter EP Application No. 14181437.6, Dated Mar. 26, 2015, 7 pages.
Hetzel, Gunter et al.; "3D Object Recognition from Range Images using Local Feature Histograms,", Proceedings 2001 IEEE Conference on Computer Vision and Pattern Recognition. CVPR 2001. Kauai, Hawaii, Dec. 8-14, 2001; pp. 394-399, XP010584149, ISBN: 978-0-7695-1272-3.

(56) References Cited

OTHER PUBLICATIONS

Intention to Grant in counterpart European Application No. 14157971.4 dated Apr. 14, 2015, pp. 1-8.
Decision to Grant in counterpart European Application No. 14157971.4 dated Aug. 6, 2015, pp. 1-2.
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages.
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
James Chamberlin, "System and Method for Picking Validation", U.S. Appl. No. 14/865,797, filed Sep. 25, 2015, 44 pages, not yet published.
Jovanovski et al., "Image-Stitching for Dimensioning", U.S. Appl. No. 14/870,488, filed Sep. 30, 2015, 45 pages, not yet published.
Todeschini et al.; "Depth Sensor Based Auto-Focus System for an Indicia Scanner," U.S. Appl. No. 14/872,176, filed Oct. 1, 2015, 44 pages, not yet published.
Wikipedia, "3D projection" Downloaded on Nov. 25, 2015 from www.wikipedia.com, 4 pages.
McCloskey et al., "Methods for Improving the Accuracy of Dimensioning-System Measurements," U.S. Appl. No. 14/873,613, filed Sep. 2, 2015, 47 pages, not yet published.
Search Report in counterpart European Application No. 15182675.7, Dated Dec. 4, 2015, 10 pages.
McCloskey et al., "Image Transformation for Indicia Reading," U.S. Appl. No. 14/982,032, filed Oct. 30, 2015, 48 pages, not yet published.
Great Britain Combined Search and Examination Report in related Application GB1517842.9, Dated Apr. 8, 2016, 8 pages.
Search Report and Opinion in Related EP Application 15176943.7, Dated Jan. 8, 2016, 8 pages, (US Application 2014/0049635 has been previously cited).
European Search Report for related EP Application No. 15188440.0, Dated Mar. 8, 2016, 8 pages.
United Kingdom Search Report in related application GB1517842.9, dated Apr. 8, 2016, 8 pages.
Great Britain Search Report for related Application on. GB1517843.7, Dated Feb. 23, 2016; 8 pages.
United Kingdom combined Search and Examination Report in related GB Application No. 1607394.2, Dated Oct. 19, 2016, 7 pages.
European Extended Search Report in Related EP Application No. 16172995.9, Dated Aug. 22, 2016, 11 pages (Only new references have been cited; U.S. Pat. No. 8,463,079 (formerly U.S. Publication 2010/0220894) and U.S. Publication 2001/0027955 have been previously cited.).
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_El-Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
European Search Report from related EP Application No. 16168216.6, Dated Oct. 20, 2016, 8 pages [New reference cited above; U.S. Publication 2014/0104413 has been previously cited].
European Extended search report in related EP Application No. 15190306.9, Dated Sep. 9, 2016, 15 pages [only new references are cited; remaining references were cited with partial search report in same application dated May 6, 2016].
Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
Extended European Search Report in related EP Application No. 16175410.0, dated Dec. 13, 2016, 5 pages.
European Extended Search Report in related EP Application No. 16173429.8, dated Dec. 1, 2016, 8 pages [Only new references cited: US 2013/0038881 was previously cited].

* cited by examiner

DIMENSIONING SYSTEM WITH MULTIPATH INTERFERENCE MITIGATION

FIELD OF THE INVENTION

The present invention relates to dimensioning systems, more specifically to a time-of-flight optical dimensioning system with reduced multipath interference.

BACKGROUND

Generally speaking the physical size of objects (i.e., an object's dimensions) may be measured automatically and without contact with a dimensioning system. These dimensioning systems typically rely on a range sensor to determine the range of points on an item. The item's size may then be computed by comparing the range of the individual points on the item. The range sensor may use ultrasonic, radio-frequency (RF), or optical signals to detect range. One such optical range sensor employs time-of-flight (TOF) measurements to measure range.

The time-of-flight (TOF) sensors offer advantages over other optical range sensors (e.g., structured light or stereo vision). One advantage of the TOF sensor is its simplicity. There are no moving parts, and the entire system may be made compact, as there are no special geometries required for sensing range. Also, the sensing and calculation of the range is relatively straight forward and requires small amount of processing power compared to other sensors. This implies a reduced power requirement and could lead to a faster dimensioning result. These advantages make TOF dimensioning systems better suited for non-fixed (i.e., mobile or handheld) dimensioning applications.

The TOF dimensioning system is not without its limitations, however. For example, a TOF sensor senses the range of an item of interest by first illuminating a scene (i.e., field of view) with a beam of light. If the field of view is large compared to the item of interest, then the light beam may reach the item of interest along several different paths. Some paths, for example, may be experience one or more reflections prior to reaching the item of interest. This is known as multipath and leads to a distorting in the range measurement, which in turn leads to dimensioning errors. Light from a reflected path may suggest that the distance to the item of interest (i.e., range) is greater than the actual physical distance. Some means of controlling the multipath distortion is necessary.

Controlling the environment that an item of interest is measured in is one approach. Here, reflections from the background may be minimized and the placement of items may be carefully controlled. In addition, the size and shape of items may be constrained. While these measures might work for a fixed installation, it would not be practical for most mobile dimensioning applications (e.g., package delivery and pickup). In these applications, neither the environment (e.g., warehouse) nor the item of interest (e.g., the package) may be controlled.

A general need exists for a dimensioning system suitable for mobile environments. A time-of-flight (TOF) dimensioning system is suitable but may suffer from multipath distortion. A specific need, therefore, exists for a TOF dimensioning system with adaptable multipath interference suppression to facilitate the accurate dimensioning of a variety of items in a variety of environments.

SUMMARY

Accordingly, in one aspect, the present invention embraces a time-of-flight (TOF) dimensioning system. The TOF dimensioning system includes an illumination subsystem configured to generate and project a light beam along an optical axis toward an item of interest. The light beam's spatial extent in a plane transverse to the optical axis is limited by an adjustable aperture. The TOF dimensioning system further includes an imager positioned and configured to capture images of the item of interest. The system also includes a TOF sensor positioned and configured to capture range images from the light beam as reflected from the item of interest. A control subsystem is further included as part of the TOF dimensioning system. The control subsystem is communicatively coupled to the adjustable aperture, the imager, and the TOF sensor and is configured (i) to determine, from the captured images, an illumination region corresponding to the item of interest (ii) to configure the adjustable aperture's size, shape, and/or position to conform with the illumination region, and (iii) to determine an at least approximate dimension measurement of the item of interest.

In an exemplary embodiment, the time-of-flight (TOF) dimensioning system's light beam substantially illuminates the illumination region and substantially reaches the item of interest without first being reflected.

In another exemplary embodiment, the time-of-flight (TOF) dimensioning system's dimension measurement is a volume.

In another aspect, the present invention embraces a time-of-flight (TOF) dimensioning system. The TOF dimensioning system includes a light source for generating light. The TOF dimensioning system also includes an optical subassembly positioned in front of the light source. The optical subassembly is configured to project a light beam along an optical axis toward an item of interest. An adjustable aperture is included in the illumination subsystem and is positioned along the optical axis between the optical subassembly and the item of interest. The adjustable aperture includes a blocking region for blocking at least a portion of the light beam. The blocking region's size, shape, and position are controllable. The TOF dimensioning system includes an imager positioned and configured for capturing images of the item of interest. A control subsystem communicatively coupled to the adjustable aperture and the imager, is also including in the TOF dimensioning system. The control subsystem is configured to determine, from the captured images, an illumination region corresponding to the item of interest's size, shape, and position. The control subsystem is further configured to control the adjustable aperture's blocking region so that light from the light source substantially illuminates the illumination region and substantially reaches the item of interest without first being reflected.

In an exemplary embodiment, the TOF dimensioning system's light source is a laser.

In another exemplary embodiment, TOF dimensioning system's optical subassembly includes a diffractive optical element (DOE).

In another exemplary embodiment, the TOF dimensioning system's adjustable aperture comprises a liquid crystal display (LCD) screen.

In yet another aspect, the present invention embraces a method for reducing multipath distortion in a time-of-flight (TOF) dimensioning system. The method includes the steps of capturing an image of an item of interest, and determining from the image, an illumination region corresponding to the item of interest. The method also includes the step of adjusting an adjustable aperture. The adjustable aperture is positioned in front of a light source so a light beam directed at the item of interest substantially illuminates the illumination region and substantially reaches the item of interest without first being reflected.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
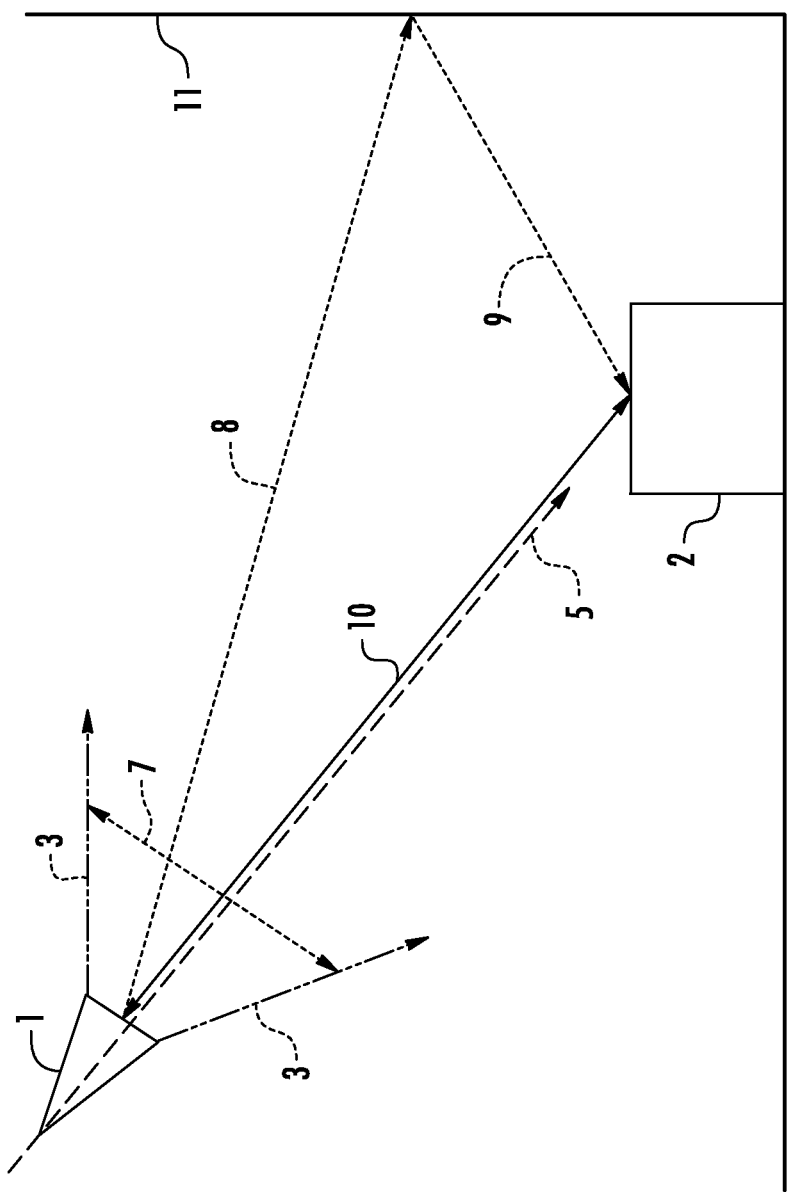
FIG. 1 graphically depicts an exemplary time-of-flight dimensioning system with multipath illumination.

The present invention embraces a system and method for mitigating multipath distortion from a time-of-flight (TOF) dimensioning system. The TOF dimensioning system is for the measurement of linear or volume dimensions. The TOF dimensioning system obtains the relative positions of points within a field of view by measuring the time it takes for a pulsed beam of light to travel a distance (e.g., the distance of a path from the TOF dimensioning system, to an object, and then back to the TOF dimensioning system).

A TOF dimensioning system 1 may use an illumination subsystem 40 to project a beam of light 3 (i.e., light beam) along an optical axis 5 toward an item of interest 2 (e.g., a package). The light beam 3 may be visible or in visible and is typically amplitude modulated, forming a pulse or pulses. The pulsed light beam illuminates the scene and is reflected by objects back to the dimensioning system's TOF sensor subsystem 45.

A typical TOF sensor subsystem 45 may include a TOF lens 46 to image the field of view onto a two-dimensional sensor (i.e., TOF sensor 47) with a plurality of photoelectric elements (i.e., pixels), each converting a small portion of the reflected light beam into an electronic signal. The resulting signal from each pixel is a pulse train. When the pixel's signal (i.e., the pulse train) is compared to the transmitted signal (i.e., the pulsed light beam's modulating signal), a phase shift between pulses may be measured. This phase shift represents the transit time (i.e., time-of-flight) of the light. What results from the TOF sensor subsystem 45 is a range image with pixels corresponding to range. The range images may be transmitted to a control subsystem 60 where they are used by software running on a processor 62 to compute various dimension measurements (e.g., volume or linear dimension).

A pixel in a TOF sensor may receive light that has travelled along different optical paths (e.g., reflected paths) prior to reaching a particular point on an object. The reflected (i.e., multipath) light has a phase shift (i.e., time difference between the reflected modulating signal and the transmitted modulated signal) that differs from the phase shift of light traveling along a direct path (i.e., light that has experienced no reflection prior to reaching the item of interest). When multipath light is present, the different phase shifted signals at each pixel combine and lead to an ambiguous range calculation. This phenomenon, known as multipath distortion, may cause errors in dimensioning or may even render a dimension measurement impossible. FIG. 1 demonstrates multipath distortion.

As shown in FIG. 1, a time-of-flight dimensioning system 1 (i.e., TOF dimensioner) may emit a light beam 3 toward an item of interest 2. Typically, the center of the light beam 3 is aligned with an optical axis 5 that is collinear with the direct path between the item of interest 2 and the TOF dimensioner 1. The size, shape, position, and intensity-distribution of the light beam 3 in this transverse plane is known as the illumination pattern. The illumination pattern may be square, polygonal shapes (e.g., hexagonal, octagonal, rhombus, U-shaped), or non-polygonal shapes (e.g., circular, oval). The shape and center of the illumination pattern is important in so far as all points on the item of interest 2 are illuminated by the light beam 3. Problems arise, however when the spatial extent 7 of the light beam 3 is much larger than the item of interest 2. Here, some of the light-beam's rays may reflect from other objects before reaching the item of interest 2.

FIG. 1 demonstrates multipath radiation by tracing the path of one such ray. Here, a transmitted ray 8 reflects from the environment 11 (e.g., a wall). The ray travels along the reflected path 9 and reaches a point on the item of interest 2. The ray is then reflected back to the TOF dimensioner 1 along the direct path 10. At the same time, a different ray is transmitted along the direct path 10 and reflected back to the TOF dimensioner 1 along the same path 10. Since both rays reach the TOF dimensioner 1 from the same point but have travelled different distances, errors may arise in the calculation of the range. The ray tracing paths 8,9, and 10 in FIG. 1 (i.e., the multipath ray) experiences a longer time-of-flight than the ray tracing the back-and-forth direct path 10 between the TOF dimensioner and the item of interest. As a result, two ranges for the same point may be calculated. This ambiguity is multipath distortion, and leads to errors in dimensioning.

Minimizing multipath illumination may be accomplished, to some degree, by limiting the size/shape of items of interest 2 or by controlling the reflective environment 11 (e.g., reducing reflections). Neither of these alternatives, however, is practical for mobile dimensioning applications (e.g., measuring the volume of packages prior to shipping). In mobile applications, the environment varies and is typically uncontrollable. In addition, a package's size/shape may be very diverse. What is more, dimensioning in mobile applications should be fast and accurate. For a TOF dimensioning system to be fast and accurate and still be suitable mobile dimensioning applications the multipath interference must be measured and controlled. The resulting system must be relatively simple so as not to undermine the aforementioned simplicity associated with TOF dimensioning systems. Embodied in the present disclosure is a system and method for mitigating the negative effects of multipath interference in a time-of-flight dimensioning system. The mitigation results from limiting the spatial extent of the illumination based on analysis of the environment prior to time-of-flight dimensioning.

Figure 2:
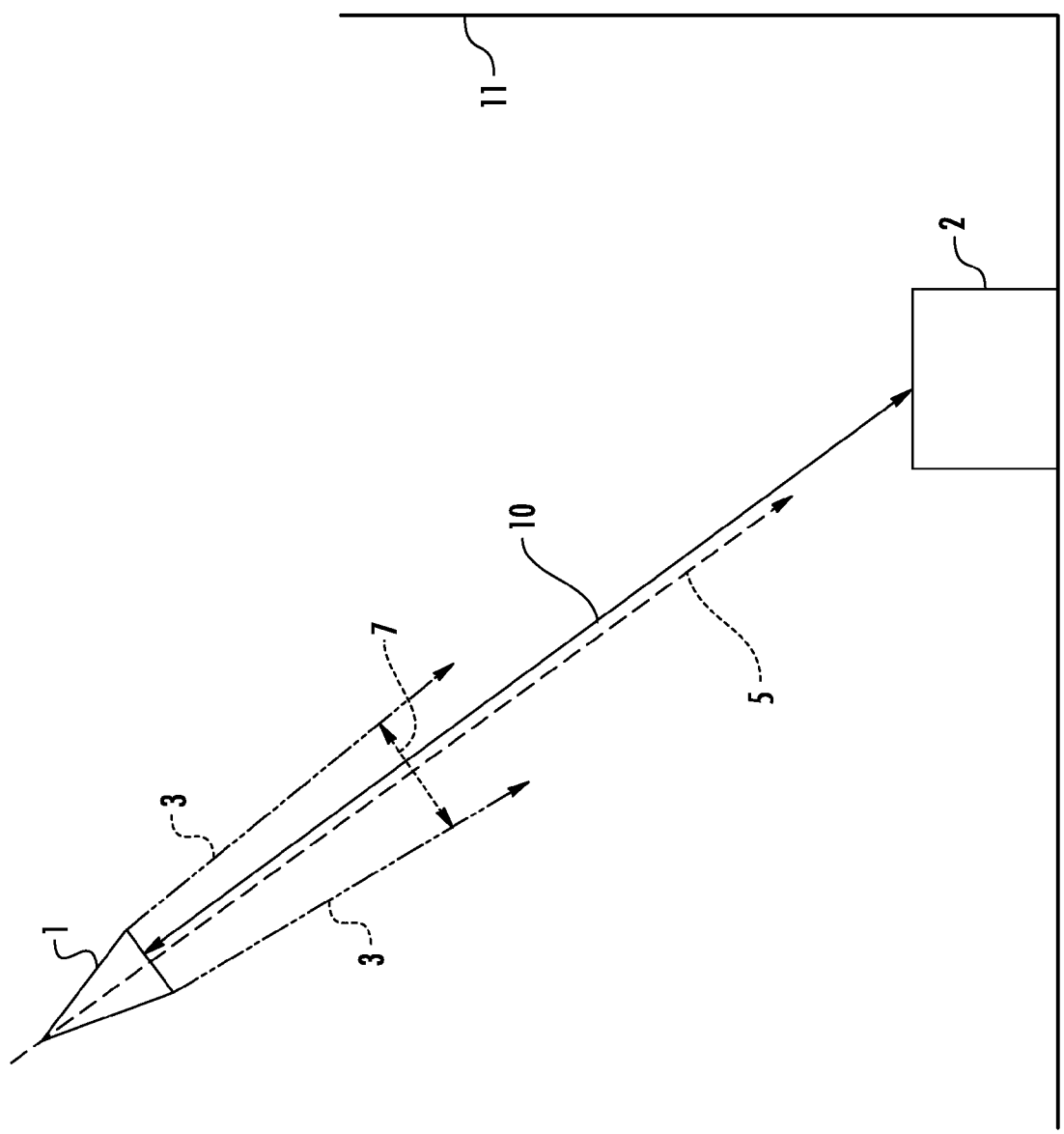
FIG. 2 graphically depicts an exemplary time-of-flight dimensioning system with no multipath illumination.

FIG. 2 graphically depicts a time-of-flight dimensioning system with no multipath illumination. In contrast to the embodiment in FIG. 1, this embodiment has no reflections from the background environment 11. The lack of multipath reflections arises from the light beam's 3 spatial extent 7 being limited to encompass the item of interest 2 and to not include the background environment 11. The ray projected from the TOF dimensioning system and following the direct path 10 reflects back to the TOF dimensioning system along the same path. There are no other rays reflecting back to the TOF dimensioning system along this path and from this point on the item of interest 2. As a result, multipath distortion is eliminated. Thus, a method to eliminate multipath interference must limit the spatial extent of the illumination so it illuminates the item of interest without first being reflected. Since many different items of interest may be dimensioned, such a method must adapt to a wide range of items of interest regardless of their size, shape, and position.

The time of flight dimensioning system includes an illumination subsystem. This subsystem uses a light source 20 and the associated driver circuitry to generate a light beam 3. The light source 20 may be a laser diode or light emitting diode (i.e., LED), and may radiate at a wavelength within the ultraviolet, visible, or infrared regions of the spectrum. The light source 20 may be filtered, polarized, collimated, or focused by an optical subassembly 25 positioned in front of the light source 20 to receive its radiation. The optical assembly 25 may include optical filters, polarizers, lenses, or other components to form and shape the light into a light beam projected along the optical axis 5 toward the item of interest 2. To limit the spatial extent 7 of the light beam 3, an adjustable aperture 30 is positioned along the optical axis between the optical subassembly and the item of interest. The adjustable aperture 30 blocks a portion of light in a blocking region. The size, shape, and position of the adjustable aperture's blocking region is controlled so the illumination substantially illuminates the item of interest 2 and does not illuminate other objects (e.g., other items situated close to the item of interest) or the background environment 11 (e.g., a wall).

The adjustable aperture 30 may be embodied in several ways. An electrically addressed spatial light modulator (EASLM) such as a liquid crystal display (LCD) device may be used as the adjustable aperture 30 of the illumination subsystem of the TOF dimensioning system. The LCD device may take any of a large variety of forms. The LCD device may include a 2 dimensional array of electrically controlled liquid crystal cells, an output polarizing filter, and a front panel (e.g., glass). The light beam 3 from the light source 20 may be polarized depending on which light source is used. If a laser is used, then an input polarizing filter may or may not be necessary, however if an unpolarized light source (e.g., LED) is used, then the LCD device should include an input polarizing filter. The LCD device uses the polarizing filters and the rotation of the light-beam's polarization as it passes through the liquid crystal cell to control the light beam's illumination pattern. In this way, various blocking regions may be configured, or in other words, the aperture's size, shape, and/or position may be adjusted.

Another possible embodiment of the adjustable aperture 30 uses a liquid crystal on silicon (i.e., LCoS) device to control (i.e., pass or block) the light beam in the plane transverse to the optical axis 5. The LCOS device is like the LCD display because it relies on the polarization control provided by an array of electronically controlled liquid cells. Unlike the LCD, which controls the transmission of a light beam, the LCOS device controls the reflection of light off a reflective backplane coated with a liquid crystal layer.

Another possible embodiment for the adjustable aperture 30 uses a digital micro-mirror device (DMD) to control the light beam 30 in the plane transverse to the optical axis 5. The DMD device uses an array of micro-mirrors to reflect portions of the light beam selectively. The array of micro-mirrors may include, for example, one hundred thousand aluminum micro-mirrors, each with a diameter or approximately 16 µm. Each micro-mirror may be mechanically positioned in an ON or OFF state. In the ON state, for example the light is reflected in such a way that it reaches the item of interest. In the OFF state, however the light is reflected in such a way so that it does not reach the item of interest. In this way, the DMD device may produce two-dimensional illumination patterns.

Figure 3A:
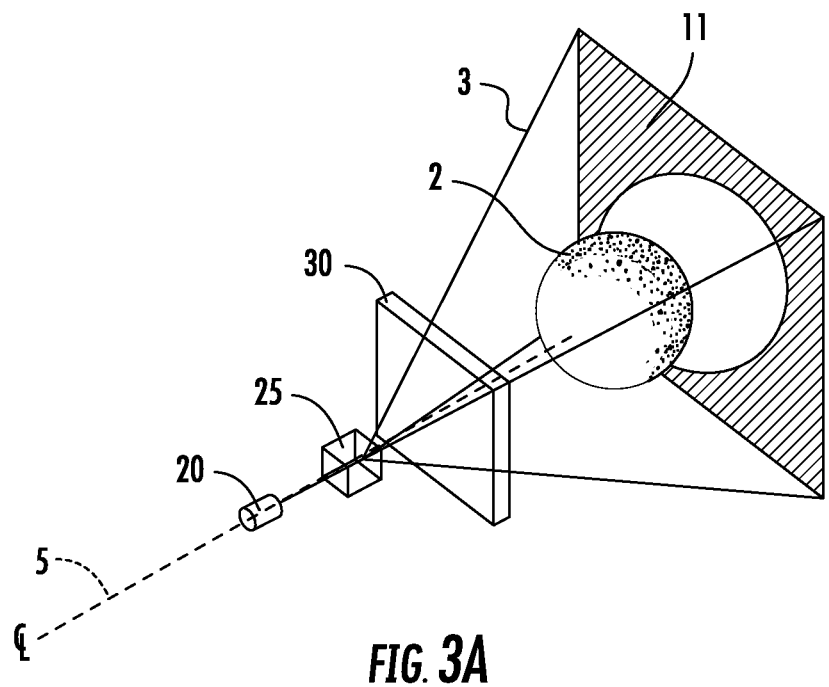
FIG. 3a graphically depicts an exemplary time-of-flight dimensioning system before aperture adjustment.
Figure 3B:
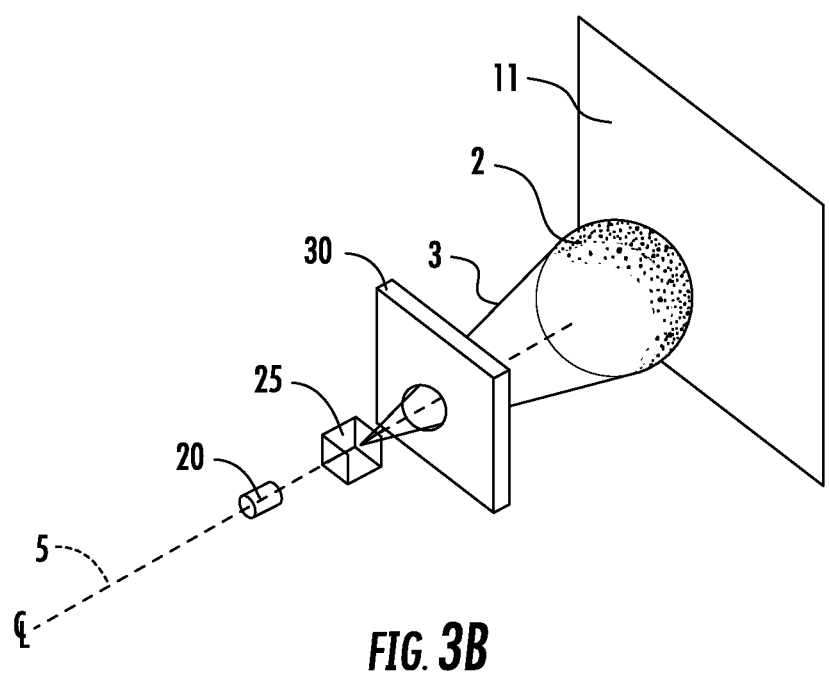
FIG. 3b graphically depicts an exemplary time-of-flight dimensioning system after aperture adjustment.

FIG. 3a graphically depicts an exemplary illumination subsystem for an optical dimensioning system. The subsystem includes components positioned along and centered on an optical axis 5. The subsystem includes a light source 20 (e.g., laser) that generates the pulsed light for measuring time of flight. The light is formed and shaped into a light beam 3 (e.g., collimated light) by an optical subassembly 25 (e.g., diffractive optical element) positioned in front of the light source. The light beam is then modified by the adjustable aperture 30 (e.g., LCD display device) that controls the size, shape, and position (with respect to the optical axis) of the light beam (i.e., illumination pattern). In FIG. 3a, there is no adjustment of the spatial extent of the light beam and as a result, the light reaches the item of interest 2 and the background 11. In contrast to FIG. 3a, FIG. 3b illustrates the illumination subsystem's adjustable aperture 30 configured to control the light beam 3 so it only illuminates the object 2.

To control the adjustable aperture there must some goal size, shape and position. Here the goal is to configure the adjustable aperture so the item of interest is exclusively illuminated. In other words, the size, shape, and position of the item of interest must first be obtained before the adjustable aperture is configured and before TOF dimensioning is executed. Without this information, the adjustable aperture cannot be adjusted properly.

Previous approaches attempted to perform the illumination adjustment by sensing errors in raw TOF sensor data and then adjusting the illumination to minimize these errors. The details of this approach were published in "Time of Flight Measurement Error Reduction Method and Apparatus" on Jan. 2, 2014 (i.e., US 20140002828 A1) which is incorporated herein by reference in its entirety. The present invention uses a different approach. Here the size, shape, and position of the item of interest is detected by an imager positioned and configured for capturing images of the item of interest. The geometric details are then derived using machine vision algorithms running on a processor (e.g., a digital signal processor (DSP)) and provided to a control subsystem 60 to configure the adjustable aperture's 30 transparent and opaque (i.e., blocking) regions.

The imager 50 is typically a digital camera system that may include a lens and a photoelectric sensor. A imaging lens 52 is typically used but this could be any optical element that could create a real image of a field of view (e.g., mirror). The photoelectric sensor (i.e., image sensor 53) typically includes a plurality of photoelectric sensors arranged as a two-dimensional array of pixels. The pixels (and associated circuitry) convert the real image of the field of view into an electronic signal. The image sensor 53 may use a charge coupled device (i.e., CCD), a complementary-metal-oxide-semiconductor (i.e., CMOS) sensor, or another sensing technology to suit the application. For example, the sensor material could be selected for sensitivity in the ultraviolet (UV), visible (VIS), or infrared (IR) regions of the spectrum and the images produced could be gray scale or color.

In some embodiments, the imager 50 may be a part of a larger system. For example, the imager 50 could be part of an indicia reading system (e.g., handheld barcode reader), and in this way, could provide images for indicia reading and to facilitate illumination control in a TOF dimensioning system.

Figure 4:
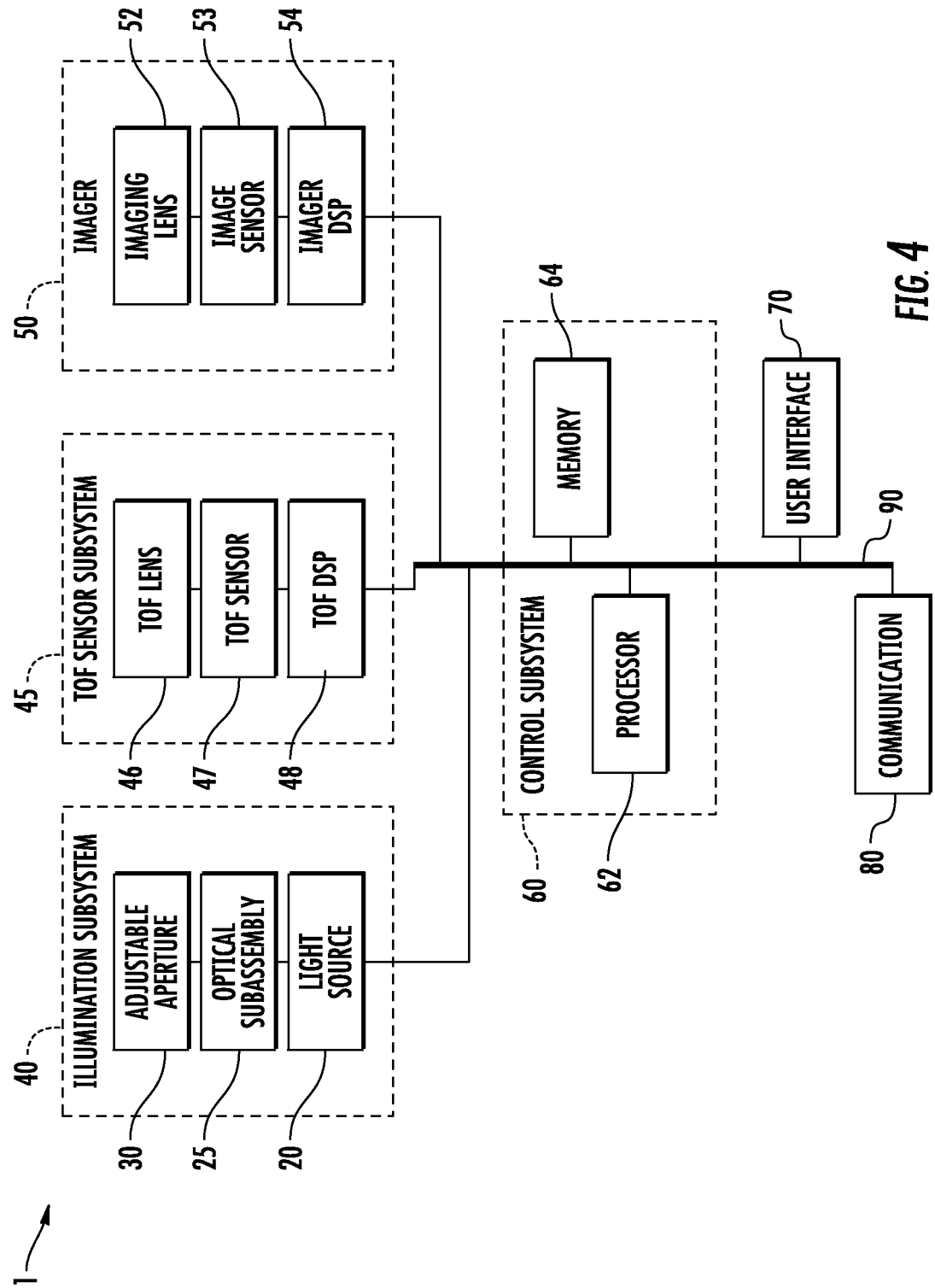
FIG. 4 schematically depicts a block diagram of an exemplary time-of-flight dimensioning system.

FIG. 4 schematically depicts a block diagram of an exemplary time-of-flight dimensioning system 1. The dimensioning system 1 includes an imager 50. The imager 50 is positioned and configured to capture images of the item of interest 2. The imager 50 includes an imaging lens 52 to form a real image of a field of view (including the item of interest) onto an image sensor 53. The image sensor 53 is configured to convert the real image into an electronic signal that is transmitted to an imager digital signal processor 54 (i.e., DSP) that creates a digital image of the item of interest and its background environment. In some possible embodiments, the imager DSP performs image processing to modify the capture images to facilitate the calculation of the item-of-interest's size, shape, and/or position.

A control subsystem 60 is communicatively coupled to the imager via an interconnection system (e.g., bus) 90, which interconnects all of the TOF dimensioning system's subsystems. The control subsystem 60 includes one or more processors 62 (e.g., one or more controllers, digital signal processor (DSP), application specific integrated circuit (ASIC), programmable gate array (PGA), and/or programmable logic controller (PLC)) to determine from the captured images an illumination region corresponding to the item of interest's size, shape, and position. The processor 62 is typically configured by a software program stored in computer readable memory (e.g., read only memory (ROM), flash memory, random access memory (RAM), and/or a hard-drive) to recognized an item's edges (e.g., edge detection). From this edge information, the area needed for illumination (i.e., illumination region) may be calculated by the processor 62 and stored in memory 64. The processor may then transmit signals corresponding to the illumination region to the illumination subsystem 40 via the bus 90.

The illumination subsystem 40 generates and shapes the beam of light for TOF dimensioning. The light beam is generated by a light source 20 (e.g., laser diode or LED). An optical subassembly 25 focuses the beam using an optical element (e.g., lens or DOE). The spatial extent of the light beam is adjusted to match the illumination region that corresponds to the item of interest using an adjustable aperture 30 (e.g., LCD, LCOS, or DMD).

A TOF sensor subsystem 45 is positioned and configured for capturing and focusing the reflected light using a TOF lens 46. A TOF sensor 47 converts the collected light into an electronic signal. This electronic signal is then processed by a TOF digital signal processor 48 (e.g., DSP) to produce a range image. The range image conveys range (e.g., via a gray scale value) between the TOF sensor 45 and the item of interest 2 at various points on the item of interest. The range image is transmitted from the TOF sensor subsystem to the processor 62 via the bus 90. The processor is configured to determine from the range images an (at least) approximate dimension measurement of the item of interest.

The TOF dimensioning system may also include a user interface 70 to provide a user with dimension measurements (e.g., linear dimension or volume) results. In some embodiments, the user interface 70 may also facilitate the identification of the item of interest by providing an interface to allow user input (e.g., selecting the item of interest).

The TOF dimensioning system may also include a communication subsystem 80 for transmitting and receiving information from a separate computing device or storage device. This communication subsystem may be wired or wireless and may enable communication with a variety of protocols (e.g., IEEE 802.11, including WI-FI®, BLUETOOTH®, CDMA, TDMA, or GSM).

The illumination subsystem 40, the TOF sensor subsystem 45, the imager 50, the control subsystem 60, the user interface 70, and the communication subsystem 80 are electrically connected via a couplers (e.g., wires or fibers), buses, and control lines to form an interconnection system 90. The interconnection system 90 may include power buses or lines, data buses, instruction buses, address buses, etc., which allow operation of the subsystems and interaction there between.

Figure 5:
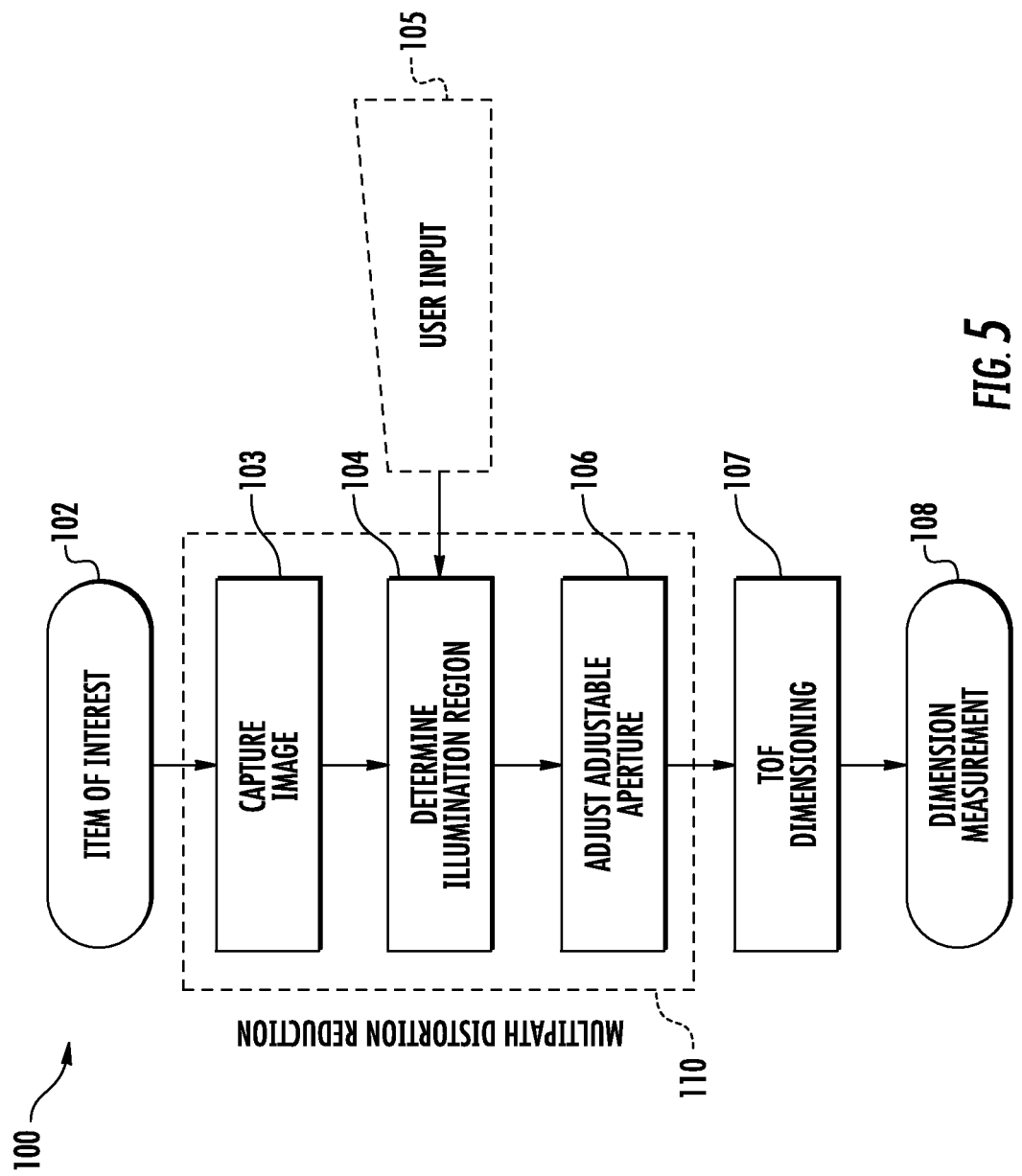
FIG. 5 schematically depicts a flowchart illustrating an exemplary method for time-of-flight dimensioning, the method including the steps for reducing multipath distortion.

FIG. 5 schematically depicts a flowchart illustrating an exemplary method for time-of-flight dimensioning 100. The method illustrated includes the steps for reducing multipath distortion 110. First, an item of interest 102 for dimensioning is placed in the field of view of the TOF dimensioning system. An image of the item of interest is then captured 103. From this image, the illumination region may be determined 104. Here, a user input 105 may also facilitate this determination. The illumination region corresponds to (e.g., matches) the item of interest's physical edges. The adjustable aperture is adjusted 106 so the light beam illuminates the illumination region substantially without first being reflected. The light reflected back to the TOF dimension system from the item of interest is used to perform the step TOF dimensioning 107. From this step, a dimension measurement (e.g., volume) is obtained 108.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;

U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;

U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing An Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application Ser. No. 29/459,785 for a Scanner and Charging Base, filed Jul. 3, 2013 (Fitch et al.);
U.S. patent application Ser. No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application Ser. No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Inciciareader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);
U.S. patent application Ser. No. 14/166,103 for Indicia Reading Terminal Including Optical Filter filed Jan. 28, 2014 (Lu et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Reublinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 29/486,759 for an Imaging Terminal, filed Apr. 2, 2014 (Oberpriller et al.);

U.S. patent application Ser. No. 29/492,903 for an INDICIA SCANNER, filed Jun. 4, 2014 (Zhou et al.); and U.S. patent application Ser. No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A time-of-flight (TOF) dimensioning system, comprising:
    an illumination subsystem configured to generate and project a light beam along an optical axis toward an item of interest, the light beam's spatial extent in a plane transverse to the optical axis being limited by an adjustable aperture;
    an imager positioned and configured for capturing images of the item of interest;
    a TOF sensor subsystem positioned and configured for capturing range images from the light beam as reflected from the item of interest; and
    a control subsystem communicatively coupled to the adjustable aperture, the imager, and the TOF sensor subsystem, the control subsystem configured (i) to determine, from the captured images, an illumination region corresponding to the size, shape, and/or position of the item of interest, (ii) to control the adjustable aperture's size, shape, and/or position to limit the light beam's spatial extent to conform with the illumination region, and (iii) to determine from the range images an at least approximate dimension measurement of the item of interest.

2. The time-of-flight (TOF) dimensioning system according to claim 1, wherein the light beam (i) substantially illuminates the illumination region and (ii) substantially reaches the item of interest without first being reflected.

3. The time-of-flight (TOF) dimensioning system according to claim 1, wherein the TOF dimensioning system is handheld.

4. The time-of-flight (TOF) dimensioning system according to claim 1, wherein the illumination subsystem comprises a diffractive optical element (DOE).

5. The time-of-flight (TOF) dimensioning system according to claim 1, wherein the adjustable aperture comprises an electrically addressed spatial light modulator (EASLM).

6. The time-of-flight (TOF) dimensioning system according to claim 1, wherein the dimension measurement is a volume.

7. A time-of-flight (TOF) dimensioning system, comprising:
    a light source to generate light;
    an optical subassembly positioned in front of the light source and configured to project a light beam along an optical axis toward an item of interest;
    an adjustable aperture positioned along the optical axis between the optical subassembly and the item of interest, the adjustable aperture comprising a blocking region for blocking at least a portion of the light beam, the blocking region having a controllable size, shape, and position;
    an imager positioned and configured for capturing images of the item of interest; and
    a control subsystem communicatively coupled to the adjustable aperture and the imager, the control subsystem configured (i) to determine from the captured images an illumination region corresponding to the item of interest's size, shape, and position and (ii) to control the adjustable aperture's blocking region to limit illumination to the illumination region so that light from the light source substantially reaches the item of interest without first being reflected.

8. The time-of-flight (TOF) dimensioning system according to claim 7, wherein the light source comprises a laser.

9. The time-of-flight (TOF) dimensioning system according to claim 7, wherein the light source comprises a light emitting diode (LED).

10. The time-of-flight (TOF) dimensioning system according to claim 7, wherein the optical subassembly comprises a lens.

11. The time-of-flight (TOF) dimensioning system according to claim 7, wherein the optical subassembly comprises a diffractive optical element (DOE).

12. The time-of-flight (TOF) dimensioning system according to claim 7, wherein the adjustable aperture comprises a liquid crystal display (LCD) screen.

13. The time-of-flight (TOF) dimensioning system according to claim 7, wherein the adjustable aperture comprises a liquid-crystal-on-silicon (LCoS) projector.

14. The time-of-flight (TOF) dimensioning system according to claim 7, wherein the adjustable aperture comprises a digital micro-mirror device (DMD).

15. The time-of-flight (TOF) dimensioning system according to claim 7, wherein the imager comprises a charge-coupled device (CCD) image sensor and a lens.

16. The time-of-flight (TOF) dimensioning system according to claim 7, wherein the imager comprises a complementary metal-oxide-semiconductor (CMOS) image sensor and a lens.

17. A method for reducing multipath distortion in a time-of-flight (TOF) dimensioning system, the method comprising:
    capturing an image of an item of interest;
    determining from the image an illumination region corresponding to the size, shape, and/or position of the item of interest; and
    adjusting an adjustable aperture positioned in front of a light source to limit a spatial extent of a light beam directed at the item of interest (i) to substantially limit illumination to the illumination region and (ii) to substantially reach the item of interest without first being reflected.

18. The method according to claim 17, wherein the image is a color image representing visible light.

19. The method according to claim 17, wherein the determining step comprises identifying in the image's pixel values discontinuities comprising the edges of the item of interest.

20. The method according to claim 17, wherein the determining step comprises prompting a user to select the illumination region from the image.

* * * * *